United States Patent [19]

Kaltenbach

[11] 4,036,092
[45] July 19, 1977

[54] TABLE-MOUNTED CIRCULAR SAW

[76] Inventor: Dieter Kaltenbach, Rebweg 33, 785 Lorrach, Germany

[21] Appl. No.: 587,738

[22] Filed: June 17, 1975

[30] Foreign Application Priority Data

Nov. 8, 1974 Germany .............................. 2452960

[51] Int. Cl.² ........................... B27B 5/04; B27B 5/18
[52] U.S. Cl. ................................... 83/471.2; 83/490; 83/603; 83/631
[58] Field of Search .................... 83/490, 471.2, 471.3, 83/601, 603, 631, 477, 461; 51/99, 165.8, 165.81

[56] References Cited

U.S. PATENT DOCUMENTS

| 555,696 | 3/1896 | Hammond | 83/490 |
|---|---|---|---|
| 2,506,076 | 5/1950 | Garrison | 83/471.2 |
| 2,623,439 | 12/1952 | Paskell | 83/490 X |
| 3,540,338 | 11/1970 | McEwan | 83/490 |
| 3,715,946 | 2/1973 | Kaltenbach | 83/490 X |
| 3,818,643 | 6/1974 | Pagella | 51/165.8 |
| 3,827,325 | 8/1974 | Ward et al. | 83/490 X |

FOREIGN PATENT DOCUMENTS 7,455  1901  United Kingdom ................... 83/490

Primary Examiner—Willie G. Abercrombie
Attorney, Agent, or Firm—Michael J. Striker

[57] ABSTRACT

A support has portions which define a working plane and an arm is pivotally mounted on this support at one end, and carries a circular saw blade which can be moved toward and away from the working plane as the arm is pivoted. Cooperating mechanical elements are provided on the arm and on the support and are power-driven so as to pivot the arm with the blade towards and away from the working plane. These mechanical elements may be rack and pinion constructions or they may be screw spindle and spindle-nut constructions.

23 Claims, 6 Drawing Figures

TABLE-MOUNTED CIRCULAR SAW

BACKGROUND OF THE INVENTION

The present invention relates to a circular saw, and more particularly to a circular saw for cold sawing, an opposed to circular saws which are used for hot sawing. Still more particularly, the present invention relates to a table-mounted circular saw.

The term table-mounted as used herein is intended to distinguish the circular saw from portable circular saws which are hand held. The present invention is concerned with a circular saw that is mounted on a support which is commonly called a saw table but which may of course have a configuration other than a table. In this type of saw, where the saw blade is mounted on an arm that is pivotable so that the blade moves toward and away from the working plane, i.e., the table surface on which the workpiece is located, problems are encountered due to the vibrations which the arm and the blade carried thereon are subject. This is particularly pronounced in cases where a power arrangement is provided which effects the movement of the arm with the blade toward and away from the working plane, because the operation of the power arrangement, i.e. the drive for pivoting the arm, tends itself to cause vibrations which are undesirable.

SUMMARY OF THE INVENTION

Accordingly, it is a general object of this invention to overcome the disadvantages of the prior art.

More particularly, it is an object of the present invention to provide an improved table-mounted circular saw, which avoids the aforementioned disadvantages and wherein vibrations resulting from the prior arrangement for moving the arm carrying the saw blade are largely eliminated.

In keeping with these objects, and with others which will become apparent hereafter, one feature of the invention resides in a table-mounted circular saw which, briefly stated, comprises support means having portions which define a working plane, an arm pivotally mounted on the support means and having an end portion which is movable toward and away from the working plane, and a circular saw blade rotatably mounted on the arm for movement therewith. Displacement is provided for positively pivoting the arm, and comprises interengaging relatively movable mechanical elements connected to the support means and the arm, respectively, and drive means cooperates with the displacement means for effecting the relative movement of the mechanical elements.

The drive means is advantageously a motor, for example an electric motor or a fluid-operated motor, and the displacement means is advantageously such that one of the relatively movable mechanical elements is elongated and rod shaped and oriented substantially in the direction of advancement of the pivoting arm. The rod shaped element may be a rack cooperating with a driven pinion, or it may be a spindle cooperating with a spindle nut, one of them being driven in rotation. It is advantageous if a roller-type spindle is employed, i.e. a spindle where bearing balls are interposed in the spindle thread between the spindle and the cooperating spindle nut, because such an arrangement is well suited for transmitting high forces with a minimum of play.

The motor may be a continuously variable electric motor, or a continuously variable hydraulic motor, and a mechanical transmission may be interposed between the motor and the element which it drives, and the transmission may be of the continuously variable type, especially if the motor should not be of the variable type.

In order to largely eliminate torsional forces acting upon the arm, especially under high stress conditions, it may be advantageous if at least that one of the elements which moves together with the arm is located at least substantially in the general plane of the saw blade. This means that forces that are transmitted by the arrangement to the arm act in effect only in the pivoting direction of the arm and torsional stresses are largely avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
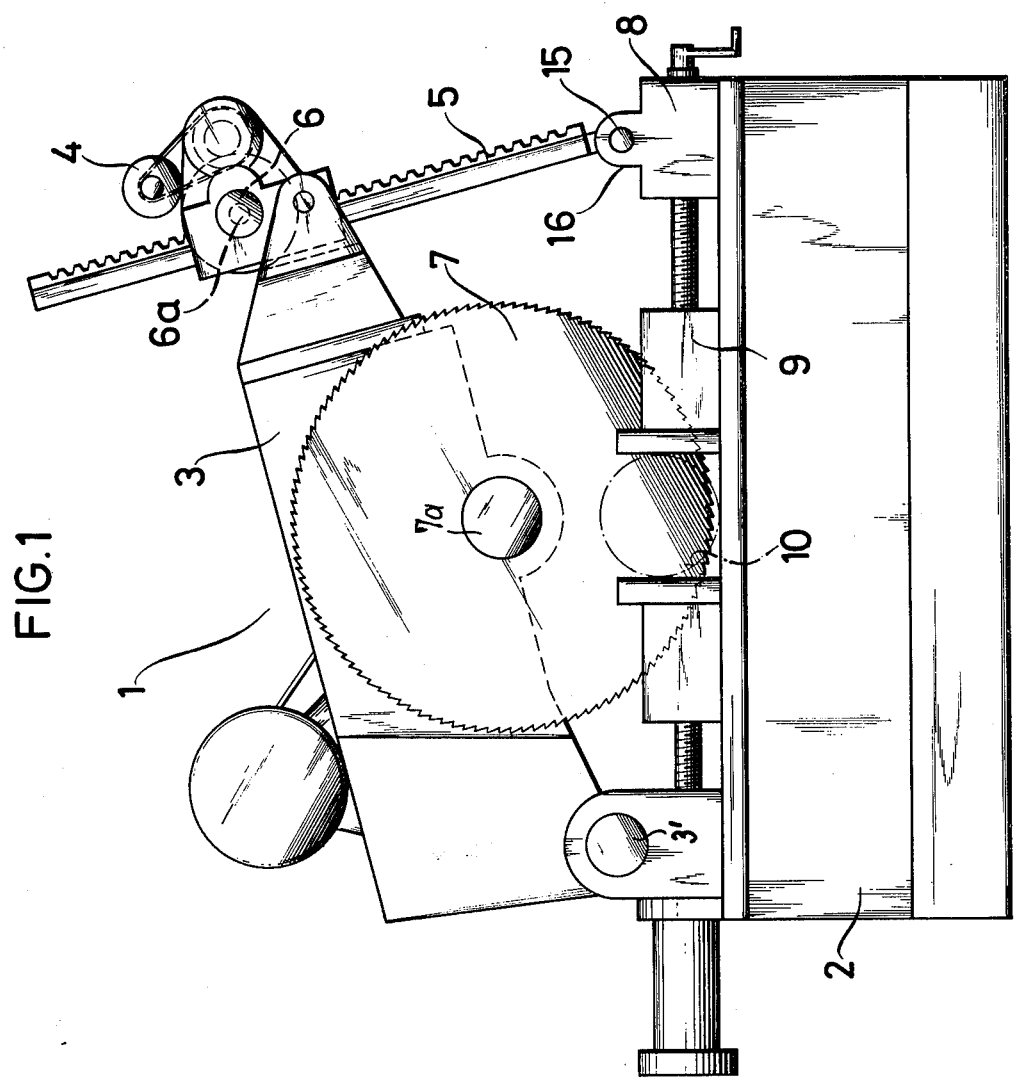
FIG. 1 is a side view of a saw embodying the invention.
Figure 2:
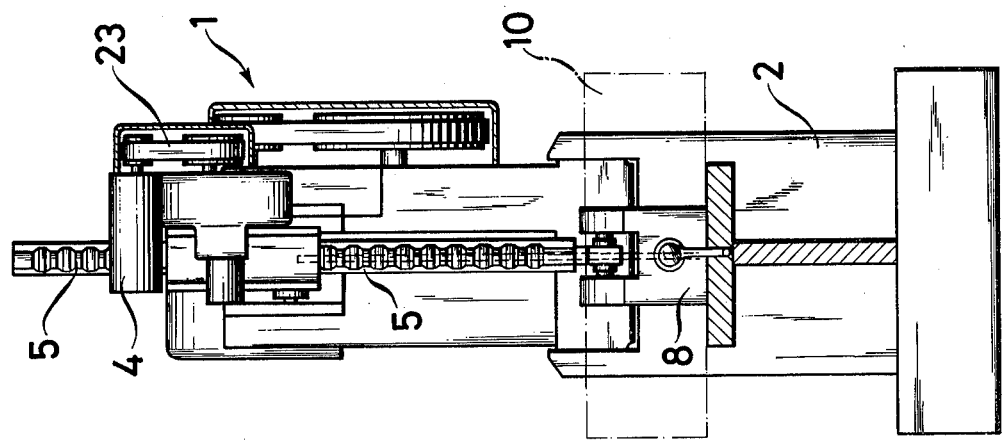
FIG. 2 is an end view of FIG. 1, looking towards the left.

Referring now firstly to the embodiment that is illustrated in FIGS. 1 and 2 it will be seen that reference numeral 2 identifies a saw table or generally support of the saw 1, on which an arm 3 is mounted for pivotal movement about the pivot axis 3'. The arm 3 carries a circular saw blade 7 which is mounted on it for turning about the axis of rotation 7a. The free end of the arm 3 is connected with displacement means which serve to positively pivot the arm 3 about the pivot axis 3'. In the embodiment of FIGS. 1 and 2 the displacement means has the elements 5 and 6 of which the element 5 is a rack which is pivoted at 15 to the saw table 2, or rather to an upstanding portion or lug 16 thereof that is provided on a mount of the workpiece holder 9 that holds in position the workpiece 10 that is to be sawed. The free end of the arm 3 carries the element 6 which is a driven pinion that meshes with the teeth of the rack 5. The axis of rotation of the pinion is identified with reference numeral 6a. The pinion 6 is driven in rotation by the drive means which is in form of a motor 4.

The axis 6a extends parallel to the axis 7a and the elongation of the teeth on the rack 5 and on the pinion 6 extends transverse to the general plane of the saw blade 7 and to the elongation of the arm 3, thereby assuring that the elements 5 and 6 can be located approximately in the plane of the blade 7 so that the transmission of torsional forces to the arm 3 is avoided. This arrangement can, incidentally also be employed in the other embodiments to be disclosed herein.

It requires no particular description to point out that the teeth of the rack 5 could be on the side thereof which faces toward the blade 7, rather than on the side facing away from it as in FIG. 1. Power is transmitted from the motor 4 to the pinion 6 via an appropriate drive in this embodiment, such as a belt drive 23 (which could also be replaced by a chain drive). The upper surface of the table 2 defines a working plane on which the workpiece 10 is supported.

Figure 3:
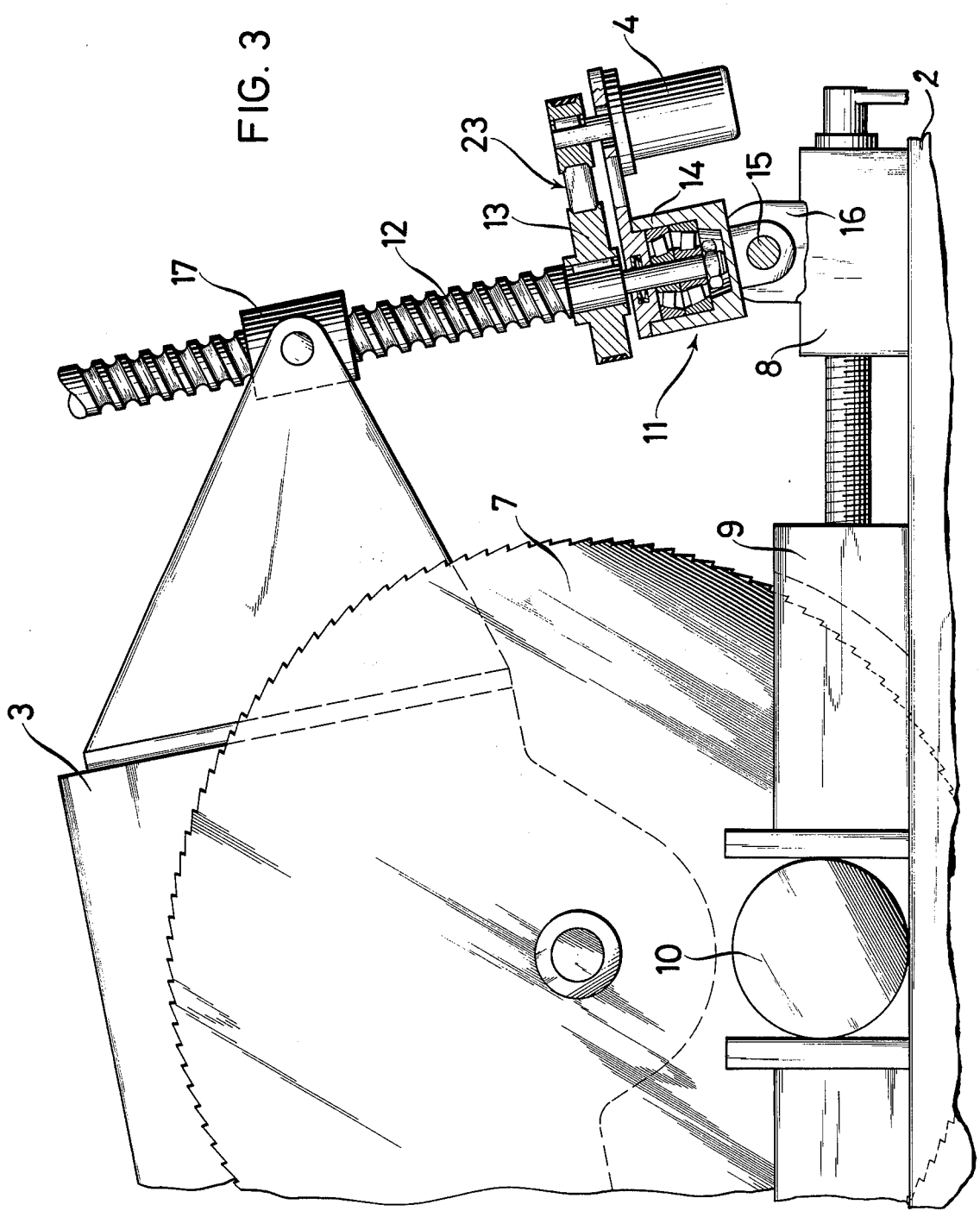
FIG. 3 is a fragmentary side view, on an enlarged scale and partly in section, illustrating a detail of a further embodiment of the invention.

The embodiment of FIG. 3 is largely the same in the basic construction as that in FIGS. 1 and 2. Therefore, FIG. 3 shows only those details which differ from FIGS. 1 and 2. In FIG. 3 the free end of the arm 3 carries a spindle nut 17 which is pivotally mounted on the arm 3 for pivoting about an axis extending parallel to the axis of rotation of the blade 7; advantageously the free end of the arm 3 is bifurcated and the spindle nut 17 is located in the space between the two parts of the free end. The spindle is identified with reference numeral 12 and extends through the nut 17 with the interior threads of which it meshes. The spindle 12 is again mounted on the lug 16 for pivotal displacement about the pivot axis 15. To be able to rotate the spindle 12 the latter carries a drive wheel 13 which is mounted on it coaxially and in such a manner that it can turn with but not relative to the spindle 12. The drive belt (or equivalent element) is trained about the wheel 13 and a pulley mounted on the output shaft of the motor 4. The motor 4 itself is mounted on an extension of a bearing box 14 which constitutes part of the spindle mount and is the element thereof that is mounted for pivotal movement about the pivot axis 15. The lower free end of the spindle 12 is turnably mounted in the spindle mount 11 within the bearing box 14 so that the spindle 12 can rotate and can also pivot with the bearing box 14 about the pivot axis 15. The spindle mount 11 includes conical roller bearings in the bearing box 14 which mount the spindle 12 for rotation and are well able to withstand the axial forces that develop when the arm 3 is pivoted.

Figure 4:
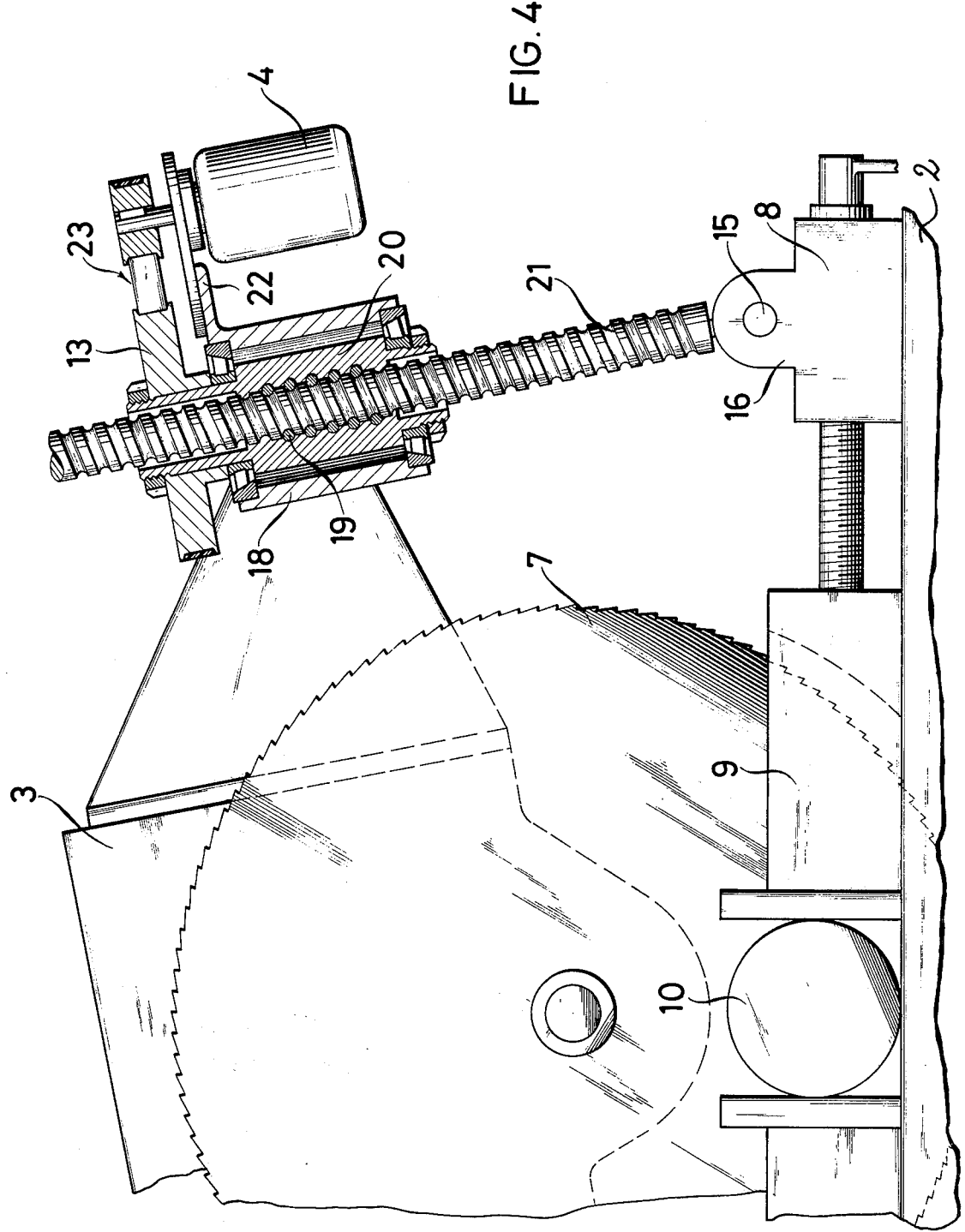
FIG. 4 is a view similar to FIG. 3 but illustrating an additional embodiment of the invention.

The embodiment in FIG. 4 is reminiscent of that in FIG. 3 and like reference numerals identify like components, as they did in FIG. 3 with respect to the reference numerals used in FIGS. 1 and 2.

In FIG. 4, however, the free end of the spindle 21 is directly pivoted to the lug 16 for pivoting about the pivot axis 15, so that the spindle can pivot about the axis 15 but cannot turn. The spindle 21 extends through and meshes with the internal threads thereof in spindle nut 20 which is turnably mounted in a housing 18 that is in turn mounted on the free end of the arm 3. Again the drive wheel 13 is provided, but in this embodiment it is fixedly connected with a portion of the spindle nut 20 that extends out of the housing 18 so that when motion is transmitted to the wheel 13 via the belt or chain drive 23 from the motor 4 which latter is mounted on a flange 22 of the housing 18, the spindle nut 20 will be turned in rotation. Bearing balls 19 are interposed in the cooperating threads of the spindle 21 and the spindle nut 20.

In the aforementioned embodiments, as well as in the others following hereafter, the motor 4 may, as already pointed out, be a continuously variable motor, such as an electric motor or a hydraulic motor, or it may be a non-variable motor, and a mechanical transmission, such as a continuously variable gear transmission, may be interposed between the motor 4 and the element which is being driven in rotation.

It is advantageous in all embodiments of the invention if the elongated element of the displacement means, i.e., the rack or the spindle, is located on a chord of the arcuate path traversed by the free end of the arm 3 when the arm is in one or the other of its end positions, i.e. in the upper or lower end position, and if this same elongated element is located on a tangent to this arcuate path when the arm is approximately midway between these end positions. It is also advantageous if the fixed pivot mount, i.e. in FIGS. 1–4 the pivot mount 15, is located approximately on this arcuate path. All of this results in a particularly favorable transmission of forces to the arm, lengthwise of the respective elongated element such as the spindle on rack, and without the development of any force components which act upon the pivot mount for the elements of the displacement means and/or the arm 3. This is advantageous especially when strong forces are to be applied, moving the arm 3 towards its working position, which is illustrated in the several embodiments.

Figure 5:
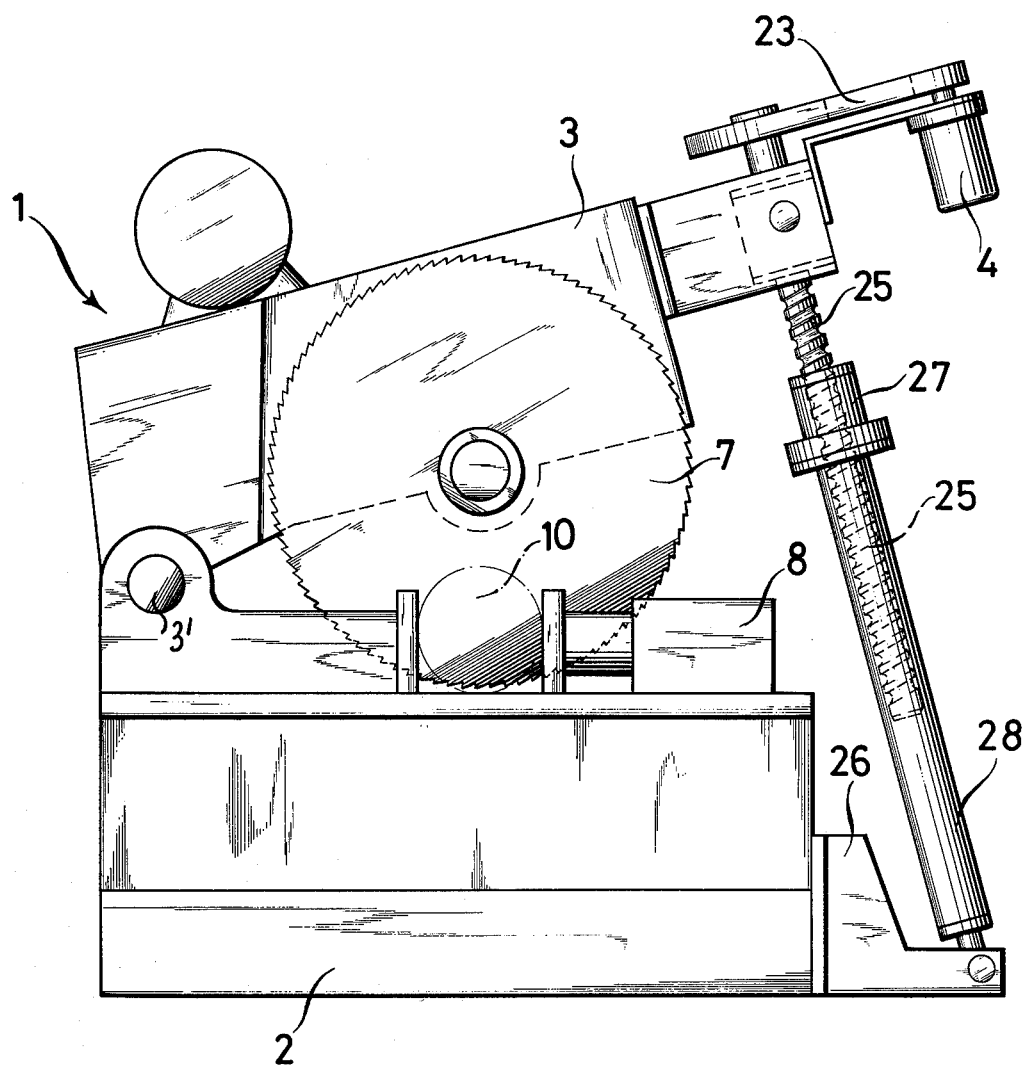
FIG. 5 is a side view of a saw according to still a further embodiment of the invention.

A further embodiment of the invention is shown in FIG. 5 where like reference numerals again identify like elements as before.

In FIG. 5 a spindle nut 27 is mounted on the upper end of a hollow elongated element, in the illustrated embodiment a tube 28, which is pivoted to an extension 26 of the saw table 2. The tube 28 and the spindle nut 27 are fixed, except for the pivotal movement. The cooperating element is the spindle 25 which meshes with the threads of the spindle nut 27 and which is journalled both for rotation and pivotal movement about a pivot axis paralleling the axis of rotation of the blade 7 on an extension of the arm 3. The upper end of the spindle 25 has mounted on it a drive wheel corresponding to the drive wheel 13 of the embodiment of FIG. 4, and a bracket mounts the motor 4 on the extension of the arm 3. A belt or chain drive 23 connects the pulley on the output shaft of the motor 4 with the drive wheel so that thereby the spindle 25 can be driven in rotation.

In this embodiment the spindle 25 enters deeper and deeper into the tube 28, or it becomes withdrawn from the same to a greater and greater extent, depending upon the direction in which the spindle 24 is rotated thereby lowering or raising the arm 3 which is pivoted at 3'. This arrangement has the advantage that the spindle is protected against damage and also that the danger of accidents to operators due to contact with the spindle, is reduced.

Figure 6:
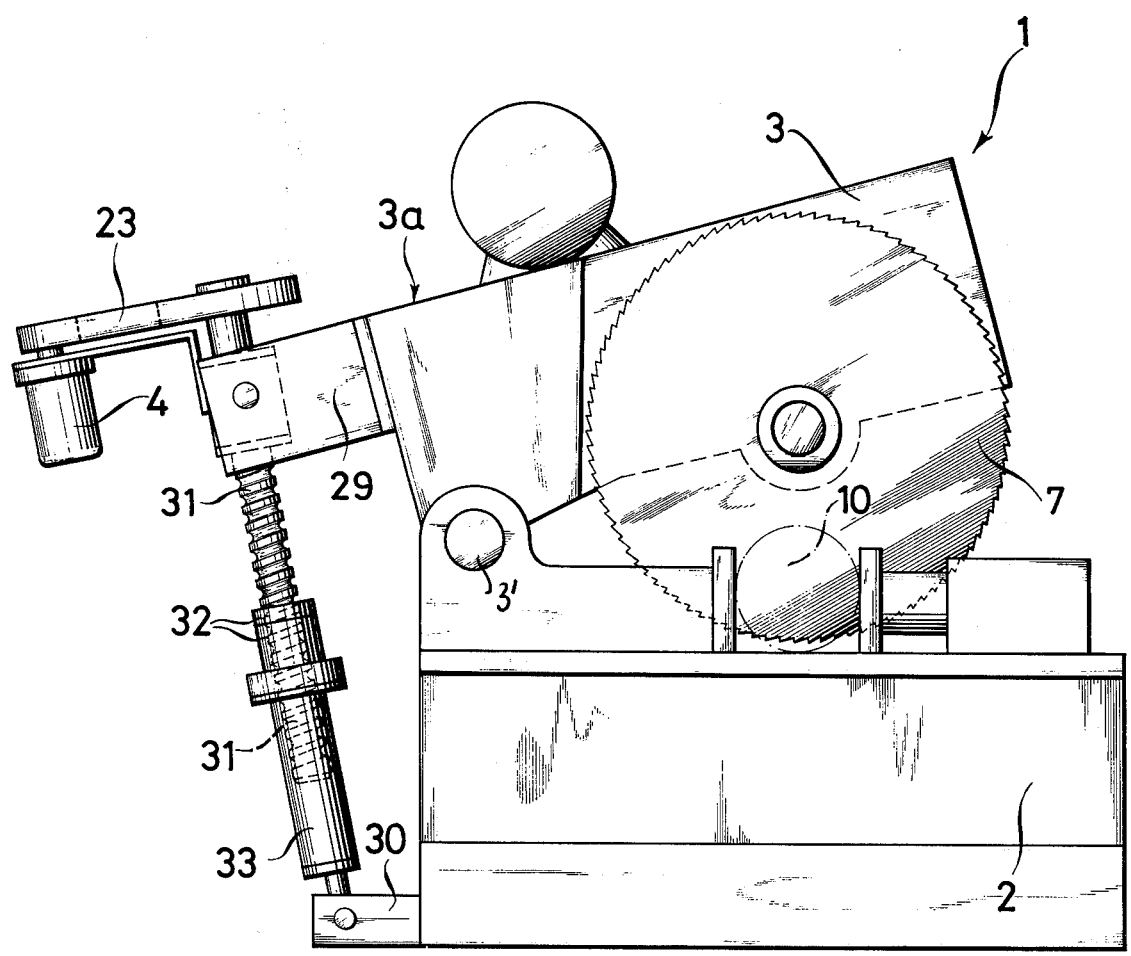
FIG. 6 is a view similar to FIG. 5 but illustrating yet a further embodiment of the invention.

FIG. 6, finally shows still a further embodiment of the invention which is considered to be of importance. Like reference numerals again identify like elements as before. In FIG. 6, the arm 3 is provided at its end 3a where it is pivoted at 3', with an extension 29. A spindle 31 is mounted on the extension 29 for pivotal movement about a pivot axis paralleling the axis of rotation of the saw blade 7. The motor 4 again is supported via a bracket on the extension 29 and drives via the belt or chain 23 a drive wheel corresponding to the drive wheel 13 of FIG. 4 which is fixedly mounted on the upper end of the spindle 31 so as to turn the latter in rotation.

A spindle nut 32 cooperates with a spindle 31 and is again mounted on the upper end of an elongated hollow member, here a tube 33, whose lower end is pivoted to an extension 30 of the saw table for pivotal movement about a pivot axis also paralleling the axis of rotation of the blade 7. Again, the spindle 31 will enter deeper into or be retracted out of the tube 33, depending upon the direction of rotation of the spindle 31.

It is evident that in FIG. 6 the displacement means is mounted at the opposite end of the arm 3 from the end where it is mounted in the embodiment of FIGS. 1–5. The embodiment of FIG. 6 is particularly advantageous if material to be cut by the blade 7 is to be introduced from the side rather than from an end of the machine. It will be appreciated that counter to the embodiment of FIG. 5, the spindle 25 is under tension when it moves the arm 3 downwardly towards the working plane defined by the table 2, the spindle in FIG. 6 is subjected to axial compressive stresses when it effects the same movement of the arm 3.

In all embodiments the motor 4 is, of course, directionally reversible to permit the spindle to be threaded out of the cooperating spindle nut or, in FIG. 1, to permit the direction of rotation of the pinion 6 to be reversed. Details of the motor 4 are not required because such motors are well known per se in the art and are readily commercially available.

It will be understood that each of the elements described above, or two or more together, may also find a useful application in other types of constructions differing from the types described above.

While the invention has been illustrated and described as embodied in a table-mounted circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A table-mounted circular saw, comprising stationary support means having portions which define a working plane; an arm pivotably mounted on said stationary support means and having an end portion which is movable towards and away from said working plane; a circular saw blade rotatably mounted on said arm for movement therewith; displacement means for positively pivoting said arm, comprising two mechanical elements interengaging and movable relative to one another, one of said elements being screw spindle means oriented lengthwise of the direction of relative movement and the other element being spindle nut means meshing with said screw spindle means, said screw spindle means and said spindle nut means connected to said support means and said end portion of said arm, respectively, and constituting the only means for pivoting said arm with said circular saw blade relative said support means; and drive means rotating one of said mechanical elements with reference to the other mechanical element.

2. A circular saw as defined in claim 1, wherein said screw spindle and said spindle nut have respective meshing threads; and further comprising spherical members received between said meshing threads.

3. A circular saw as defined in claim 1, wherein said drive means comprises a continuously variable drive.

4. A circular saw as defined in claim 3, wherein said continuously variable drive comprises a continuously variable electric motor.

5. A circular saw as defined in claim 3, wherein said continuously variable drive comprises a continuously variable hydraulic motor.

6. A circular saw as defined in claim 1, wherein said drive means comprises a continuously variable motor; and a transmission interposed between the same and said displacement means.

7. A circular saw as defined in claim 1, wherein said drive means comprises a prime mover, and a transmission interposed between the same and said displacement means.

8. A circular saw as defined in claim 1, wherein at least that one of said elements which is connected to said arm is located at least substantially in the plane of said saw blade.

9. A circular saw as defined in claim 1, wherein one of said elements is substantially rod-shaped; and further comprising means pivotally connecting said rod-shaped displacement means to said support means.

10. A circular saw as defined in claim 1, wherein one of said elements is an elongated screw spindle having an end portion pivoted to said support means, and the other of said elements is a spindle nut mounted on said arm and meshing with said spindle.

11. A circular saw as defined in claim 10, wherein said spindle comprises a bearing box turnably journalling said end portion and pivoted to said support means, and a drive wheel coaxially surrounding said spindle and connected to the same for rotation therewith, said drive means transmitting rotary motion to said drive wheel.

12. A circular saw as defined in claim 10, further comprising a housing mounted on said arm and rotatably accommodating said spindle nut, said drive means being carried by said housing, and wherein said spindle is fixed against rotation relative to said spindle nut.

13. A circular saw as defined in claim 12; and further comprising spherical members interposed in the meshing screw threads of said spindle and said spindle nut.

14. A circular saw as defined in claim 10; further comprising a drive wheel mounted coaxially on one of said spindle and spindle nut for rotation with the same; and wherein said drive means comprises transmission means for transmitting rotary motion to said drive wheel.

15. A circular saw as defined in claim 14, wherein said transmission means comprises a transmission belt.

16. A circular saw as defined in claim 1, said arm being movable along an arc between two end positions and an intermediate position, said spindle nut means being movable with said arm along said arc; and wherein said screw spindle means are is elongated and has an end portion articulated to said support means for pivotal movements about a pivot axis between first orientations in which said screw spindle means extend substantially along a chord of said arc when said arm is in one of said end positions and a second orientation in which said other element extends at a tangent to said arc when said arm is in said intermediate position.

17. A circular saw as defined in claim 16, wherein said pivot axis is located on said arc.

18. A circular saw as defined in claim 1, wherein said arm has a further end portion at which it is pivoted, said further end portion being provided with a longitudinal extension, and wherein one of said elements is connected to said extension 19. A circular saw as defined in claim 18, wherein said one elements is a pivotably mounted rotatable screw spindle, and the other of said elements is a non-rotatable spindle nut pivoted to said support means and meshing with said spindle, said drive means being operative for rotating said spindle.

20. A circular saw as defined in claim 19, wherein said spindle nut includes a hollow coaxial member having an end pivoted to said support means, said spindle being adapted to move into and out of said hollow member through said spindle nut.

21. A circular saw as defined in claim 1, said displacement means including mounting means mounting said screw spindle means and said spindle nut means and operative for causing said screw spindle means and said spindle nut means to perform a tilting motion in response to the rotation of said one of said mechanical elements effected by said drive means.

22. A table mounted circular saw, comprising stationary support means having portions which define a working plane; an arm pivotally mounted on said stationary support means and having an end portion which is movable towards and away from said working plane; a circular saw blade rotatably mounted on said arm movement therewith; displacement means for positively pivoting said arm, comprising two mechanical elements interengaging and movable relative to one another, one of said elements being a rotary screw spindle oriented lengthwise of the direction of the relative movement and pivotally mounted on said arm, and the other element being a non-rotatable spindle nut meshing with said screw spindle and mounted on said support means; said spindle nut includes an elongated hollow coaxial member into and out of which said screw spindle is adapted to move so as to protect said screw spindle from contamination by a material removed by sawing; and drive means rotating said screw spindle relative to said spindle nut.

23. A circular saw as defined in claim 22, said displacement means including mounting means mounting said screw spindle and said spindle nut and operative for causing said screw spindle and said spindle nut to perform a tilting motion in response to the rotation of the screw spindle effected by said drive means.

* * * * *